US010342005B2

United States Patent
Song et al.

(10) Patent No.: US 10,342,005 B2
(45) Date of Patent: Jul. 2, 2019

(54) METHODS FOR DETERMINING A HARQ-ACK CODEBOOK SIZE FOR A USER EQUIPMENT AND BASE STATION

(71) Applicant: Telefonaktiebolaget LM Ericsson (publ), Stockholm (SE)

(72) Inventors: Xinghua Song, Beijing (CN); Mattias Andersson, Sundbyberg (SE); Daniel Larsson, Lund (SE); Shaohua Li, Beijing (CN); Yu Yang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/752,515

(22) PCT Filed: Aug. 15, 2016

(86) PCT No.: PCT/SE2016/050755
§ 371 (c)(1),
(2) Date: Feb. 13, 2018

(87) PCT Pub. No.: WO2017/030489
PCT Pub. Date: Feb. 23, 2017

(65) Prior Publication Data
US 2018/0242286 A1    Aug. 23, 2018

(30) Foreign Application Priority Data
Aug. 14, 2015    (WO) ................ PCT/CN2015/087080

(51) Int. Cl.
*H04L 1/00*    (2006.01)
*H04W 72/04*    (2009.01)
(Continued)

(52) U.S. Cl.
CPC ......... *H04W 72/042* (2013.01); *H04L 1/0072* (2013.01); *H04L 1/1812* (2013.01);
(Continued)

(58) Field of Classification Search
CPC ... H04L 1/0072; H04L 1/1864; H04L 5/0053; H04L 1/1861; H04L 1/1887; H04L 1/1812; H04W 72/042
See application file for complete search history.

(56) References Cited

U.S. PATENT DOCUMENTS

| 2011/0280164 | A1 | 11/2011 | Luo et al. |
| 2018/0102892 | A1* | 4/2018 | Lunttila ................. H04L 1/1607 |
| 2018/0241510 | A1* | 8/2018 | Shen ......................... H04L 1/18 |

FOREIGN PATENT DOCUMENTS

WO    2013138021 A1    9/2013

OTHER PUBLICATIONS

International Search Report and Written Opinion dated Oct. 3, 2016 for International Application No. PCT/SE2016/050755, consisting of 12-pages.

(Continued)

*Primary Examiner* — Anez C Ebrahim
(74) *Attorney, Agent, or Firm* — Sage Patent Group

(57) ABSTRACT

An embodiment herein discloses a method performed by a Base Station, BS. The BS determines a Hybrid Automatic Repeat Request-Acknowledgement, HARQ-ACK, codebook size for a User Equipment, UE, based on data to be transmitted in a data transmission to the UE. The HARQ-ACK codebook size indicates the number of HARQ-ACK bits that the UE encodes for transmitting Hybrid Automatic Repeat Request, HARQ, feedback for the data transmission to the BS. The BS further transmits an indication of the HARQ-ACK codebook size in a Downlink Assignment Index, DAI, field of a Downlink, DL, assignment to the UE.

12 Claims, 9 Drawing Sheets

(51) Int. Cl.
*H04L 1/18* (2006.01)
*H04L 5/00* (2006.01)
*H04L 5/14* (2006.01)

(52) U.S. Cl.
CPC .......... *H04L 1/1861* (2013.01); *H04L 1/1864* (2013.01); *H04L 1/1887* (2013.01); *H04L 5/001* (2013.01); *H04L 5/0055* (2013.01); *H04L 5/0094* (2013.01); *H04L 5/0023* (2013.01); *H04L 5/14* (2013.01)

(56) References Cited

OTHER PUBLICATIONS

3GPP TSG RAN WG1 Meeting #81, R1-152463, Title: "HARQ-ACK Codebook size determination and fallback operation for up to 32 component carriers", Agenda Item: 6.2.2.2.2, Source: Huawei, HiSilicon, Document for: Discussion/Decision, Location and Date: Fukuoka, Japan, May 25-29, 2015, consisting of 4-pages.

3GPP TSG RAN WG1 #81, R1-152852, Title: "Discussion on HARQ-ACK bits reduction for eCA", Agenda item: 6.2.2.2.2, Source: Samsung, Document for: Discussion and Decision, Location and Date: Fukuoka, Japan, May 25-29, 2015, consisting of 4-pages.

3GPP TSG RAN WG1 #81, R1-153069, Title: "ACK/NACK codebook performance for CA enhancements", agenda tern: 6.2.2.2.2.2, Source: Ericsson, Document for: Discussion and Decision, Location and Date: Fukuoka, Japan, May 25-29, 2015, consisting of 4-pages.

3GPP TSG RAN WG1 meeting #63bis, R1-11009, Title: "Coding and resource mapping for UCI on PUSCH", Agenda item: 6.2.1, Source: Huawei, HiSilicon, Document for: Discussion / Decision, Location and Date: Dublin, Ireland, Jan. 17-21, 2011, consisting of 5-pages.

Supplementary European Search Report dated Mar. 18, 2019 for European Patent Application No. EP 16837397.5, 14 pages.

Interdigital Communications: "HARQ-ACK reporting for aggregation of upto 32 carriers," 3GPP TSG-RAN WG1 Meeting #81, R1-153081, Fukuoka, Japan, May 25-29, 2015, 4 pages.

Ericsson: "HARQ-ACK transmission for Rel-13 CA enhancement," 3GPP TSG RAN WG1 Meeting #82, R1-154420, Beijing, China, Aug. 24-28, 2015, 5 pages.

\* cited by examiner

METHODS FOR DETERMINING A HARQ-ACK CODEBOOK SIZE FOR A USER EQUIPMENT AND BASE STATION

CROSS-REFERENCE TO RELATED APPLICATIONS

This application is a Submission Under 35 U.S.C. § 371 for U.S. National Stage Patent Application of International Application Number: PCT/SE2016/050755, filed Aug. 15, 2016 entitled "METHODS FOR DETERMINING A HARQ-ACK CODEBOOK SIZE FOR A USER EQUIPMENT AND BASE STATION," which claims priority to International Application Number: PCT/CN2015/087080, filed Aug. 14, 2015, the entireties of both of which are incorporated herein by reference.

TECHNICAL FIELD

The present disclosure generally relates to the technical field of wireless communications, and particularly, to a method performed by a User Equipment (UE) and the associated UE, to a method performed by a Base Station (BS) and the associated BS.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Long Term Evolution (LTE) uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1a, where each resource element corresponds to one OFDM subcarrier during one OFDM symbol interval.

FIG. 1b illustrates a LTE time-domain structure. As shown in FIG. 2, in the time domain, LTE downlink transmissions are organized into radio frames of 10 ms. Each radio frame consists of ten equally-sized subframes of a length Tsubframe=1 ms.

Furthermore, the resource allocation in LTE is typically described in terms of resource blocks, where a resource block corresponds to one slot, e.g. 0.5 ms, in the time domain and 12 contiguous subcarriers in the frequency domain. A pair of two adjacent resource blocks in time direction, e.g. 1.0 ms, is known as a resource block pair. Resource blocks are numbered in the frequency domain, starting with 0 from one end of the system bandwidth.

The LTE Carrier Aggregation (CA) feature was introduced in Rel-10 and enhanced in Rel-11. It offers means to increase the peak data rates, system capacity and user experience by aggregating radio resources from multiple carriers that may reside in the same band or different bands and, for the case of inter-band Time Division Duplex (TDD) CA, may be configured with different UpLink (UL)/DownLink (DL) configurations. In Rel-12, CA between TDD and Frequency Division Duplex (FDD) serving cells is introduced to support UE connecting to them simultaneously. In Rel-13, Licensed-Assisted Access (LAA) has attracted a lot of interest in extending the LTE CA feature towards capturing the spectrum opportunities of unlicensed spectrum in the 5 GHz band. Wireless Local Area Network (WLAN) operating in the 5 GHz band nowadays already supports 80 MHz in the field and 160 MHz is to follow in Wave 2 deployment of IEEE 802.11ac. There are also other frequency bands, such as 3.5 GHz, where aggregation of more than one carrier on the same band is possible, in addition to the bands already widely in use for LTE. Enabling the utilization of at least similar bandwidths for LTE in combination with LAA as IEEE 802.11ac Wave 2 will support calls for extending the CA framework to support more than 5 carriers. The extension of the CA framework beyond 5 carriers was approved to be one work item for LTE Rel-13. The objective is to support up to 32 carriers in both UL and DL.

To support up to 32 carriers in DL, the Uplink Control Information (UCI) feedback, e.g. Hybrid Automatic Repeat Request (HARQ)-Acknowledgement (ACK) bits will increase significantly. For each DL subframe, one or two HARQ-ACK bits per carrier need to be reported depending on if spatial multiplexing is configured. Hence, for FDD, there can be up to 64 HARQ-ACK bits if there are 32 DL carriers. The number of HARQ-ACK bits for TDD is even larger, up to hundreds of bits depending on the TDD configuration. Therefore, new Physical Uplink Control CHannel (PUCCH) format(s) supporting larger payload is necessary. Similarly, the increased number of UCI bits also motivates the enhancements on UCI feedback on Physical Uplink Shared CHannel (PUSCH).

In LTE Rel-8, PUCCH format 1/1a/1b and PUCCH format 2/2a/2b are supported for Scheduling Request (SR), HARQ-ACK and periodic Channel State Information (CSI) reporting. The PUCCH resource is represented by a single scalar index, from which the phase rotation and the orthogonal cover sequence, only for PUCCH format 1/1a/1b, are derived. The use of a phase rotation of a cell-specific sequence together with orthogonal sequences provides orthogonality between different terminals in the same cell transmitting PUCCH on the same set of resource blocks.

In LTE Rel-10, PUCCH format 3 was introduced for CA and TDD, when there are multiple downlink transmissions, either on multiple carriers or multiple downlink subframes, but single uplink, either single carrier or single uplink subframe, for HARQ-ACK, SR and CSI feedback. Similarly, the PUCCH format 3 resource is also represented by a single scalar index from which the orthogonal sequence and the resource-block number can be derived. A length-5 orthogonal sequence is applied for PUCCH format 3 to support code multiplexing within one resource-block pair and a length-4 orthogonal sequence is applied for shorted PUCCH.

In LTE Rel-13, new PUCCH format design is ongoing to support a larger number of UCI bits.

In general, the exact relationship between the number of HARQ-ACK bits and the transmitted signals can be referred to as an encoding codebook of a CA PUCCH scheme. It is evident that the codebook needs to be synchronized between the UE and the evolved Node B (eNB, known collectively as BS hereinafter) for the HARQ-ACK feedback signal to be correctly processed and understood and processed on both sides. Basically, there are three different codebook adaptations:

Codebook adapted to the number of detected (Enhanced) PDCCHs (E)PDCCHs;
Codebook adapted to the number of activated Component Carriers (CCs);

Codebook adapted to the number of configured CCs.

The first option is clearly problematic since the UE may miss detecting (E)PDCCHs from the BS, which immediately leads to divergence of codebooks assumed by the two sides. HARQ operations and status can thus be corrupted rather frequently.

The second option provides improved stability and reliability over the first option in the period between activation and de-activation of CCs. HARQ-ACK bit fields corresponding to CCs with no detected (E)PDCCHs are set to 0 (NAK) by the UE. The activation and de-activation of CC is performed via Medium Access Control (MAC) control elements. Due to HARQ feedback errors in the (de)-activation message, this signalling is not very reliable. In addition, CCs can also be autonomously and hence unilaterally de-activated by the UE based on UE-side timers. Therefore, basing the codebook adaptation on the CC activation state could be error prone.

The third option is a slow codebook adaptation and seems to be less efficient and have worse link performance than first two options at first glance. However, it has been shown that it has similar link performance as the first option 1 with smart BS decoding based on the fact that BS is aware of the scheduled and non-scheduled carriers. Therefore, it was agreed to be adopted in Rel-10.

Slow codebook adaptation is applied in LTE Rel-10, i.e. the HARQ-ACK codebook size for PUCCH format 3 is determined based on the number of configured CCs. In Rel-13, CA is enhanced to support up to 32 CCs, and slow codebook adaptation can still be applied to ensure the common understanding between the BS and UE. Smart decoding is also necessary so that the information of known bits can be utilized at the BS receiver. However, it should be noted that if there are many known bits compared to the unknown bits, the link performance of slow codebook performance will be degraded. On the other hand, among the 32 carriers, there are many unlicensed carriers which may not be accessible due to contention failure. It will not very efficient to determine the HARQ-ACK codebook size in a semi-static manner. Therefore, there is a motivation to use fast codebook adaptation.

It was proposed to use Downlink Assignment Index (DAI) signaling mechanism to indicate to the UE the number of scheduled carriers/subframes. The DAI in the DL assignment will be used to determine both the HARQ-ACK codebook size and the HARQ-ACK bit ordering. However, if the "last" grant(s) is missed by the UE, there will be misunderstanding between the BS and the UE regarding the HARQ-ACK codebook size. Consequently, the BS cannot correctly decode the PUCCH. One method to solve this problem is to do blind detection at the BS, e.g., the BS assumes that the UE missed certain (E)PDCCH assignments and attempts to decode the PUCCH for each assumed HARQ-ACK codebook size. The disadvantage of this method is that the BS needs to perform one or more additional decoding procedures. This is very complicated.

SUMMARY

It is in view of at least one of the above considerations and others that the various embodiments of the present technology have been made. An object of the present disclosure is to provide an efficient way of handling control channels and to provide improved signaling methods for indicating the HARQ-ACK codebook size for a UE.

According to a first aspect the object is achieved by providing a method performed by a Base Station, BS. The BS determines a HARQ-ACK codebook size for a UE based on data to be transmitted in a data transmission to the UE. The HARQ-ACK codebook size indicates a number of HARQ-ACK bits for the UE to encode for transmitting HARQ feedback for the data transmission to the BS. The BS transmits an indication of the HARQ-ACK codebook size in a DAI field of a DL assignment to the UE.

According to a second aspect the object is achieved by providing a method performed by a user equipment, UE. The UE receives from a BS an indication of a HARQ-ACK codebook size. The HARQ-ACK codebook size indicates a number of HARQ-ACK bits for the UE to encode for transmitting Hybrid Automatic Repeat Request, HARQ, feedback for data received from the BS in a data transmission. The indication is comprised in a DAI field of a DL assignment for the UE. The UE further encodes the number of HARQ-ACK bits indicated by the HARQ-ACK codebook size indicated by the received indication for the HARQ feedback to the BS for the data received in the data transmission from the BS.

According to a third aspect the object is achieved by providing a BS. The BS is configured to determine a HARQ-ACK codebook size for a UE, based on data to be transmitted in a data transmission to the UE. The HARQ-ACK codebook size indicates a number of HARQ-ACK bits for the UE to encode for transmitting HARQ feedback for the data transmission to the BS. The BS is further configured to transmit an indication of the HARQ-ACK codebook size in a DAI field of a DL assignment to the UE.

According to a fourth aspect the object is achieved by providing a UE. The UE is configured to receive from a BS an indication of a HARQ-ACK codebook size. The HARQ-ACK codebook size indicates a number of HARQ-ACK bits for the UE to encode for transmitting HARQ feedback for data received from the BS in a data transmission. The indication is comprised in a DAI field of a DL assignment for the UE. The UE is further configured to encode the number of HARQ-ACK bits indicated by the HARQ-ACK codebook size indicated by the received indication for the HARQ feedback to the BS for the data received in the data transmission from the BS.

According to a fifth aspect of the present disclosure, there is provided a computer program product storing instructions that when executed, cause one or more computing devices of the user equipment or the base station to perform the method of any one of the first to the fourth aspects.

According to the aspects of the present disclosure, the BS explicitly informs the UE of the HARQ-ACK codebook size. Accordingly, the adverse impact of the UE missing (E)PDCCH assignment can be mitigated, such that misunderstanding between the BS and the UE regarding the HARQ-ACK codebook size can be avoided.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Figure 1A:
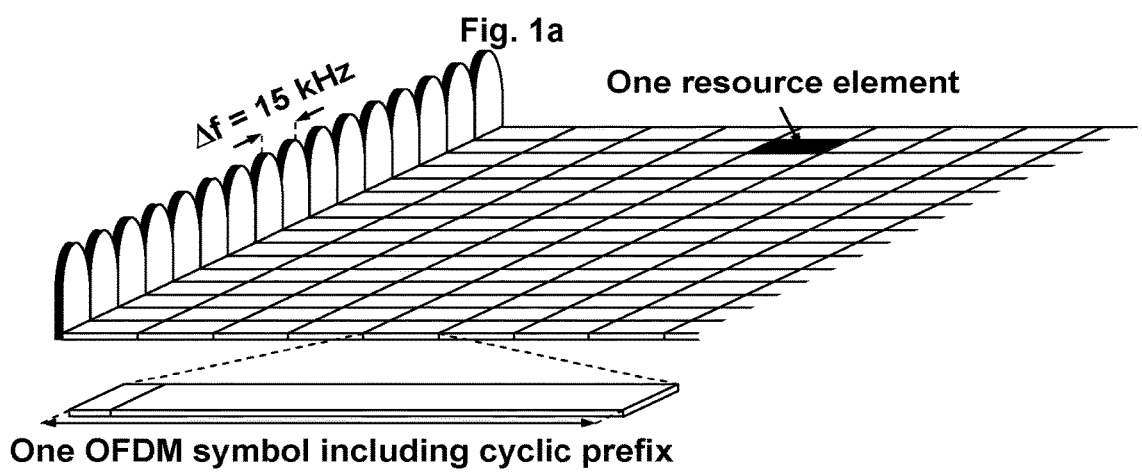
FIG. 1a illustrates LTE downlink physical resources.
Figure 1B:
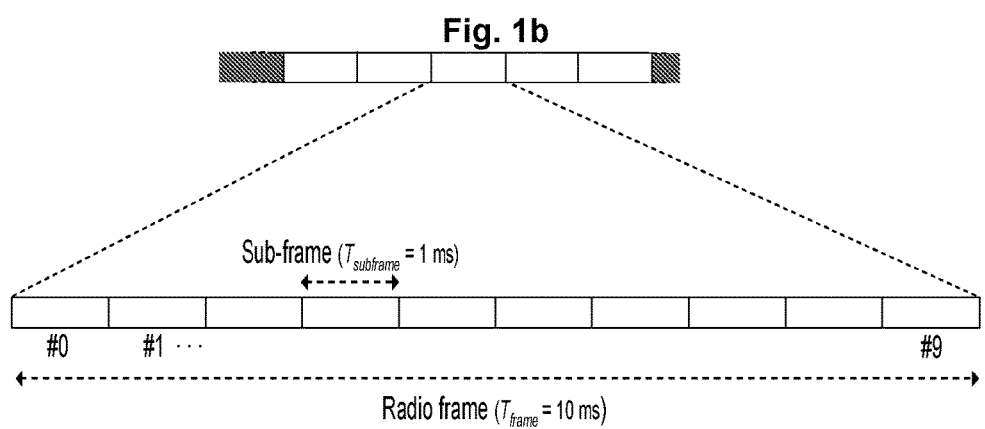
FIG. 1b illustrates a LTE time-domain structure.
Figure 2A:
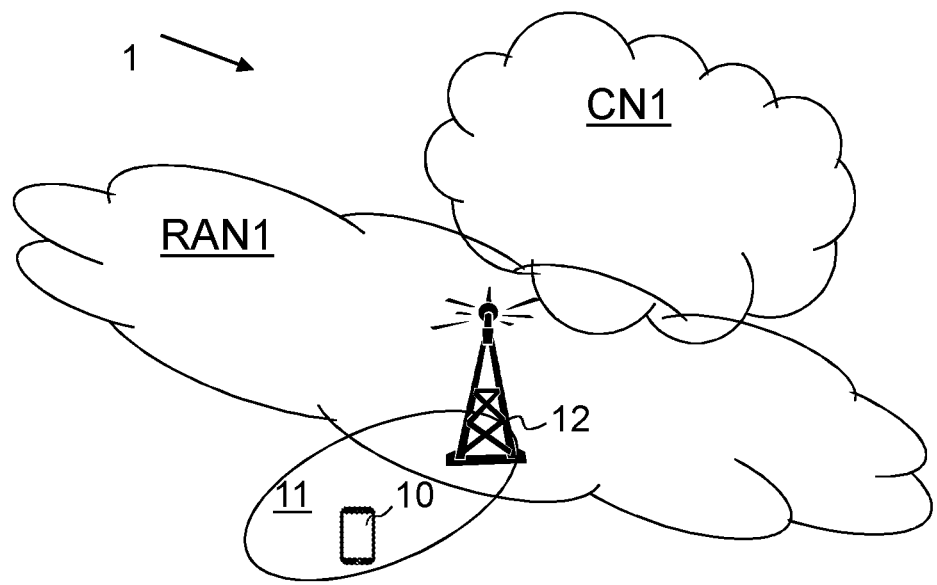
FIG. 2a is a schematic overview depicting a wireless communication network according to embodiments herein.

Embodiments herein relate to wireless communication networks in general. FIG. 2a is a schematic overview depicting a wireless communication network 1. The wireless communication network 1 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system. Thus, although terminology from 3GPP LTE may be used in this disclosure to exemplify embodiments herein, this should not be seen as limiting the scope of the embodiments herein to only the aforementioned system.

In the wireless communication network 1, a user equipment 10, also known as a mobile station, a wireless device and/or a wireless terminal, communicates via a Radio Access Network (RAN) to one or more core networks (CN). It should be understood by the skilled in the art that "user equipment" is a non-limiting term which means any wireless terminal, user equipment, Machine Type Communication (MTC) device, a Device to Device (D2D) terminal, or node e.g. Personal Digital Assistant (PDA), laptop, mobile phone, sensor, relay, mobile tablets or even a small base station communicating within respective cell.

The wireless communication network 1 covers a geographical area which is divided into cell areas, e.g. a cell or beam 11 being served by a base station 12. The base station 12 may also be referred to as a radio base station and e.g. a NodeB, an evolved Node B (eNB, eNode B), a base transceiver station, Access Point Base Station, base station router, or any other network unit capable of communicating with a user equipment within the cell served by the radio base station depending e.g. on the radio access technology and terminology used. The base station 12 may serve one or more cells, such as the cell 11.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. A cell may be referred to as a service area, a beam or similar.

The base station 12 communicates over the air or radio interface operating on radio frequencies with the UE 10 within range of the base station 12. The UE 10 transmits data over the radio interface to the base station 12 in Uplink (UL) transmissions and the base station 12 transmits data over an air or radio interface to the UE 10 in Downlink (DL) transmissions. In response to reception of data transmitted in a DL transmission to the UE 10, the UE 10 is to indicate in HARQ feedback in a UL transmission to the BS 12 whether or not the data has been correctly received at the UE 10. The HARQ feedback is conveyed to the BS 12 in a number of HARQ-ACK bits that is determined based on a HARQ-ACK codebook size.

In the present disclosure it is further proposed to indicate the HARQ-ACK codebook size for the UL transmission, e.g. on PUCCH, by an indication transmitted by the BS 12 to the UE 10.

Hereinafter, the HARQ-ACK codebook size indicates the number of HARQ-ACK bits for the UE 10 to encode for transmitting HARQ feedback for a data transmission to the BS 12.

Figure 2B:
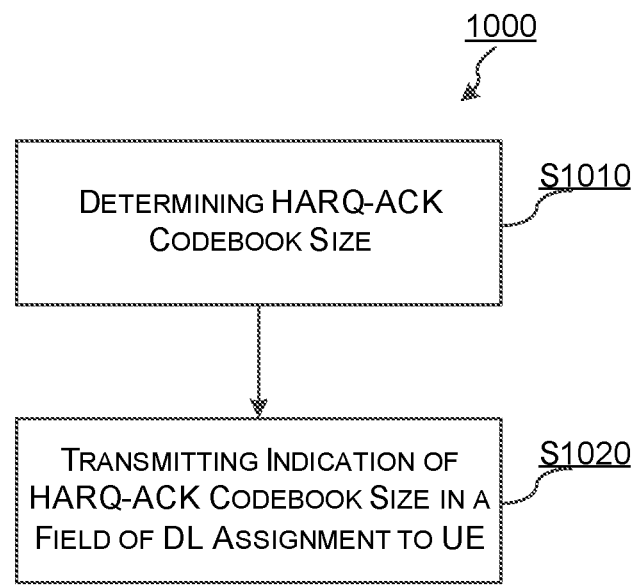
FIG. 2b schematically illustrates a method 1000 used in a BS according to embodiments herein.

FIG. 2b schematically illustrates a method 1000 used in the BS 12 according to embodiments of the present disclosure. The method is applicable for signalling HARQ-ACK codebook size for PUCCH as well as for signalling HARQ-ACK codebook size for other channels, e.g. PUSCH.

At step S1010, the BS 12 determines a HARQ-ACK codebook size for the UE 10 based on data to be transmitted in the data transmission to the UE 10. The HARQ-ACK codebook size indicates the number of HARQ-ACK bits for the UE 10 to encode for transmitting HARQ feedback for the data transmission to the BS 12.

At step S1020, the BS 12 transmits the indication of the HARQ-ACK codebook size in a DAI field of a DL assignment to the UE 10. The field may be the DAI field in a DCI message.

The data transmission to the UE 10 may be scheduled on a set of carriers comprised in a group of carriers, wherein the transmitting, in step S1020, of the indication of the HARQ-ACK codebook size in the DAI field of the DL assignment to the UE 10 may comprise transmitting, for the set of carriers, respective DCI messages. Each DCI message may comprise the DAI field and the indication of the HARQ-ACK codebook size transmitted in the DAI field of each DCI message may indicate the same first value for the set of carriers. This will improve detecting that carriers from the group are scheduled as the DAI value is sent a number of times. In some embodiments one DCI message is transmitted for each carrier in the set of carriers.

The first value may indicate an order by which the set of carriers comprised in the group is scheduled relative to a further group of carriers comprising a further set of carriers also scheduled for the data transmission. Scheduling the data transmission may comprise scheduling time-frequency resources on the set of carriers as well as time-frequency resources on the further set of carriers.

The first value may indicate the HARQ-ACK codebook size for the group. Alternatively or additionally, the first value may indicate the order by which the set of carriers comprised in the group is scheduled relative to a further group of carriers comprising a further set of carriers also scheduled for the data transmission. As an example, using a length 2 for the DAI field, the BS 12 could by transmitting any one of the values 00, 01, 10 or 11 in the DAI field of the respective DCI messages for the set of carriers indicate that the set of carriers belong to a group comprising carriers that are scheduled first or fifth, second or sixth, third or seventh, fourth or eighth, etc. in order. In an example where carriers are grouped into eight groups numbered 0-7, where carriers from groups 1-6 are scheduled in order according to the group numbering whereas no carriers from groups 0 and 7 are scheduled for a data transmission, the DAI field may indicate in DCI messages for carriers from group 1 DAI value 00, for carriers from group 2 DAI value 01, for carriers from group 3 DAI value 10, for carriers from group 4 DAI value 11, for carriers from group 5 DAI value 00 and for carriers from group 6 DAI value 01. In this example, it may be assumed that the grouping of carriers is pre-configured, and that the UE 10 thus knows in advance which group a carrier belongs to. When receiving the DAI value 01 for the scheduled carriers of group 6, the UE 10 may deduce from having received DCI messages with DAI values 00, 01, 10, 11, 00, 01 this carriers from six different groups are scheduled. This sequence, taken together with the pre-configured grouping of carriers indicates the HARQ-ACK codebook size to the UE 10. The UE may then determine from the HARQ-ACK codebook size, and thereby the number of HARQ-ACK bits to encode for the HARQ feedback, based on the number of carriers comprised in each group of carriers that comprises one or more carriers upon which the data transmission is scheduled.

In some embodiments, the data transmission to the UE 10 is thus further scheduled on a further set of carriers comprised in a further group of carriers. In such embodiments, the transmitting, in step S1020, the indication of the HARQ-ACK codebook size in the DAI field of the DL assignment to the UE further comprises transmitting, for the further set of carriers, respective DCI messages. Each DCI message may comprise the DAI field and the indication of the HARQ-ACK codebook size transmitted in the DAI field of each DCI message may indicate the same further value for the further set of carriers. The further value may be different from said first value. This allows for using the DAI as a dynamic indication that a carrier belongs to a specific group to the UE 10. As an example, using a length 2 for the DAI field, the BS 12 could by transmitting any one of the values 00, 01, 10 or 11 in the DAI field of the DCI message for a carrier indicate that the carrier belongs to any one of the four groups: group 0, e.g. indicated by DAI value 00, group 1 indicated by DAI value 01, group 2 indicated by DAI value 10 or group 3 indicated by DAI value 11. To enable indication of further groups, the length of the DAI filed could be extended.

The BS 12 may determine the HARQ-ACK codebook size for the UE 10, by determining respective HARQ-ACK codebook sizes for the group and the further group.

The HARQ-ACK bits may be ordered per group and carrier within group.

The DCI messages may comprise a bit field specifically indicating which group of carriers has been scheduled. The bit field may indicate all groups from which carriers are scheduled. For example, assume that there are three different groups configured. Then there will be three bits in the bit field, each corresponding to one of the groups. If a bit is set to zero it means that none of the carriers in the corresponding group is scheduled, and no HARQ should be fed back for carriers in this group. If a bit is set 1 to it means that at least one carrier in the corresponding group is scheduled, and the UE 10 should feed back HARQ for all carriers in the group. To find out the HARQ codebook size, the UE 10 determines the number of bits for each group that has at least one carrier scheduled by multiplying the number of carriers in the group with the number of layers, and then adding resulting products together. E.g. with three groups of five carriers each and two layer transmission, if the bit field is set to 101 there are 10 HARQ bits to feedback for group 1, 0 for group 2 and 10 for group 3. The HARQ codebook size is then 20. Additionally or alternatively, the bit field may be the DAI field, which for e.g. group 0 indicates 00, group 1 indicates 01, group 2 indicates 10, group 3 indicates 11 when the bit field is 2 bits long but this could be extended to indicate further groups.

The HARQ-ACK codebook size may be based on the number of carriers comprised in each group of carriers that comprises one or more carriers upon which the data transmission is scheduled.

The DAI field may indicate the HARQ feedback size, i.e. the HARQ-ACK codebook size within a set of preconfigured sizes. The DAI field could potentially be extended to be longer than 2 bits. To remove the cases of erroneous detection between UE 10 and BS 12, all the scheduled DCI messages should indicate the same DAI value. If, however, the BS 12 always schedules many carriers in a group, the DAI value in a given subset of carriers should always be the same. The HARQ-ACK codebook size may then be given by adding up the sizes indicated by the groups of DCI messages.

Further, to enable a reliable decoding at the BS side, the order of the HARQ bits may be given as follows: HARQ-ACK bits are ordered by an index per carrier and group that they belong to. In other words, the HARQ-ACK bits are ordered by the index per group and carrier within group. The basic assumption is that the BS 12 is more likely to schedule carrier belonging to a specific group together than schedule one carrier per group. This comes from the assumption of operating in unlicensed spectrum wherein the channel access scheme for DL could link 4 or 5 carriers together, i.e., in case they are close to each other in frequency. So, if the UE 10 detects one carrier that is scheduled within the group, it will assume that the whole group is scheduled and generate HARQ feedback for that specific group.

In an implementation, the bit field instead indicates specifically which groups of carriers has been scheduled. This in order to avoid different understanding between the UE 10 and BS 12 about the number of scheduled carriers.

Figure 2C:
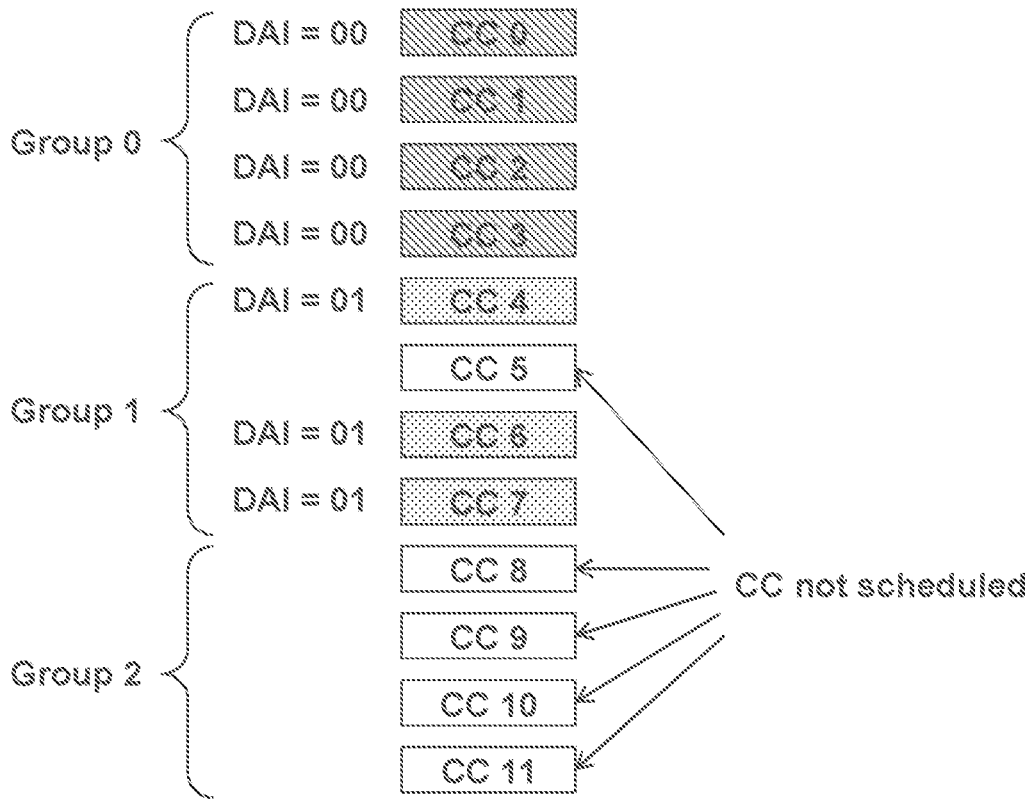
FIG. 2c illustrates an example for indicating the HARQ-ACK codebook size based on the combination of DAI and carrier grouping.

FIG. 2c illustrates an example for indicating the HARQ-ACK codebook size based on the combination of DAI and carrier grouping.

As shown in FIG. 2c, CCs 0~3 are assigned to Group 0, CCs 4~7 are assigned to Group 1 and CCs 8~11 are assigned to Group 2. In each group, the carriers are sorted in an ascending order, which may be also used for HARQ-ACK bits ordering. In this example, all the CCs are scheduled in Group 0 while CC 5 in Group 1 and all carriers in Group 2 are not scheduled. The DAI values in the DCI messages for Group 0 are set to '00' while the DAI value in the DCI messages for Group 1 are set to '01'. Since there is at least one CC scheduled in Group 0 and Group 1, the HARQ-ACK codebook size may be determined by assuming 8 carriers.

The method actions performed by the UE 10 of a method 200 according to some embodiments will now be described with reference to a flowchart depicted in FIG. 2d. The method may be applied for HARQ-ACK codebook size for PUCCH as well as for HARQ-ACK codebook size for other channels, e.g. PUSCH. The actions do not have to be taken in the order stated below, but may be taken in any suitable order. Actions performed in some embodiments are marked with dashed boxes.

Action S201. The UE 10 receives from the BS 12, the indication of the HARQ-ACK codebook size, the HARQ-ACK codebook size indicating the number of HARQ-ACK bits for the UE to encode for transmitting HARQ feedback for the data received from the BS in the data transmission. The indication is comprised in the DAI field of the DL assignment for the UE 10.

Action S202. The UE 10 may determine the HARQ-ACK codebook size based on the indication. The HARQ-ACK codebook size for the UE 10 may in some embodiments be determined as respective HARQ-ACK codebook sizes for the group and the further group.

Action S203. The UE 10 encodes the number of HARQ-ACK bits indicated by the HARQ-ACK codebook size, which HARQ-ACK codebook size is in turn indicated by the received indication of the HARQ-ACK codebook size, for the HARQ feedback to the BS for the data received in the data transmission from the BS.

In some embodiments the data transmission to the UE 10 may be scheduled on the set of carriers comprised in the group of carriers. In such embodiments, receiving the indication of the HARQ-ACK codebook size comprised in the DAI field of the DL assignment for the UE in action S201 comprises receiving, for the set of carriers, respective DCI messages. Each DCI message may comprise the DAI field and the indication of the HARQ-ACK codebook size received in the DAI field of each DCI message may indicate the same first value for the set of carriers.

The first value may indicate the order by which the set of carriers comprised in the group is scheduled relative to the further group of carriers comprising the further set of carriers also scheduled for the data transmission.

In some embodiments the data transmission to the UE 10 is further scheduled on the further set of carriers comprised in the further group of carriers. In such embodiments, receiving, the indication of the HARQ-ACK codebook size comprised in the DAI field of the DL assignment for the UE in action S201 comprises receiving, for the further set of carriers, respective DCI messages. Each DCI message may comprise the DAI field and the indication of the HARQ-ACK codebook size received in the DAI field of each DCI message may indicate the same further value for the further set of carriers, which further value may be different from said first value.

The HARQ-ACK bits may be ordered per group and carrier within group.

The DCI messages may comprise the bit field specifically indicating which group of carriers has been scheduled.

The HARQ-ACK codebook size may be based on the number of carriers comprised in each group of carriers that comprises one or more carriers upon which the data transmission is scheduled.

The present disclosure also proposes several signaling methods to indicate the HARQ-ACK codebook size for PUCCH by the UE 10 to the BS 12.

Figure 3:
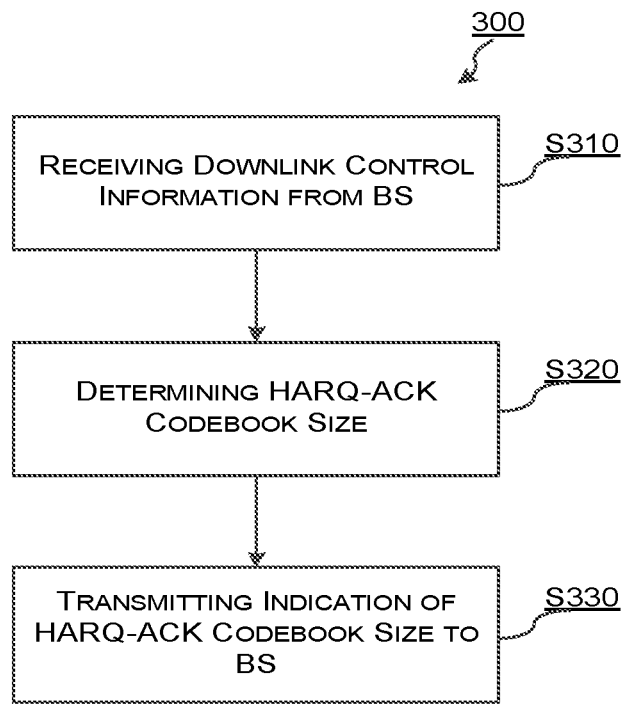

FIG. 3 schematically illustrates a method 300 used in a UE according to embodiments of the present disclosure. The method 300 may be applied in a scenario where the UE is to transmit HARQ feedback to the corresponding BS, in response to data transmission from the BS.

At step S310, the UE receives downlink control information from the BS. The downlink control information may include a DL assignment or the like information.

At step S320, the UE determines a HARQ-ACK codebook size based on the downlink control information. The HARQ-ACK codebook size indicates the number of HARQ-ACK bits for the UE to encode for transmitting HARQ feedback to the BS. For example, the HARQ-ACK codebook size may be determined based on the total number of DL (E)PDCCH assignments that should have been received by the UE.

Figure 7:
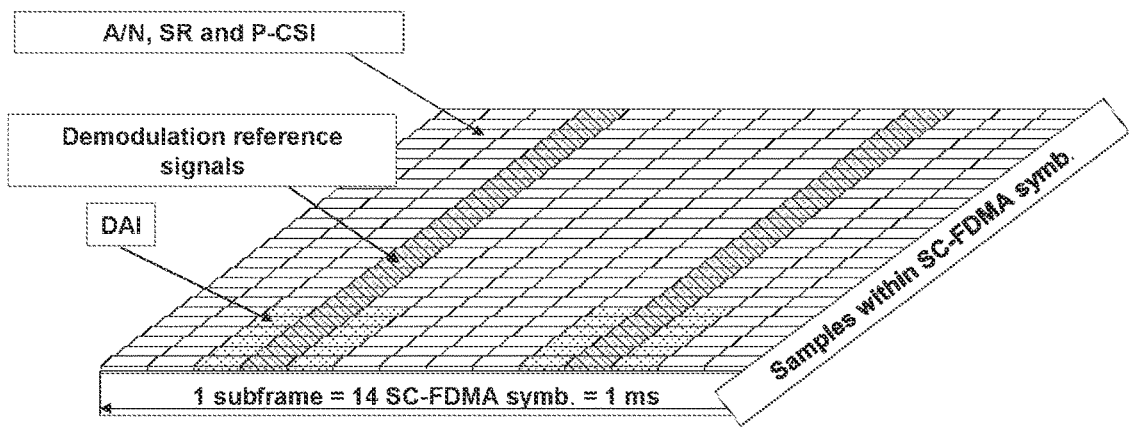
FIG. 7 illustrates an exemplary mapping for HARQ-ACK codebook size in PUCCH resource.

At step S330, the UE transmits an indication of the determined HARQ-ACK codebook size to the BS over one or more PUCCH resource elements, e.g., as shown in FIG. 7.

Figure 4:
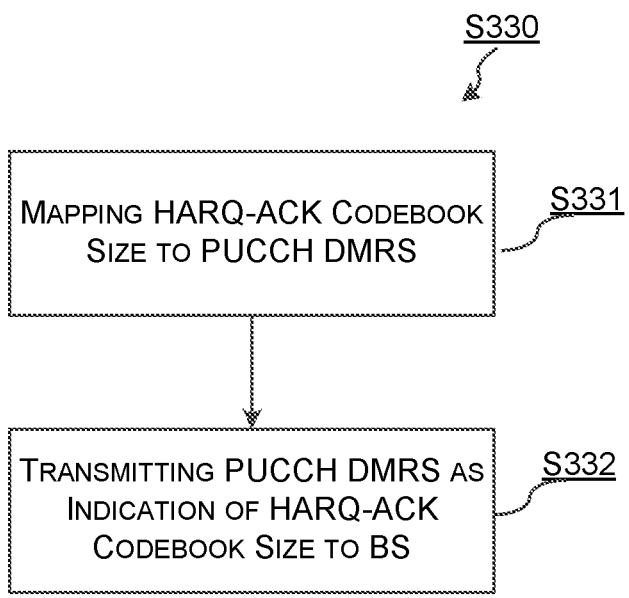

In an embodiment, step S330 may include steps S331 and S332 as shown in FIG. 4.

At step S331, the UE maps the determined HARQ-ACK codebook size to a PUCCH DMRS sequence.

At step S332, the UE transmits the PUCCH DMRS sequence as the indication of the determined HARQ-ACK codebook size to the BS.

Figure 5:
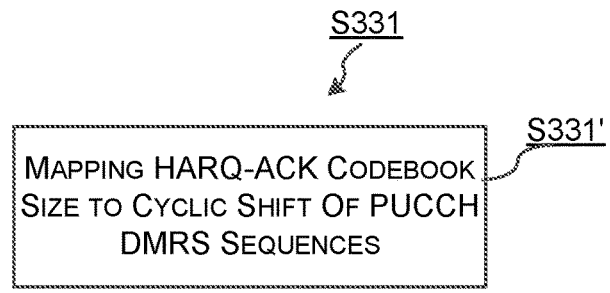

In an implementation, step S331 may be implemented by step S331' as shown in FIG. 5. At step S331', the UE maps the determined HARQ-ACK codebook size to a cyclic shift of PUCCH DMRS sequences, e.g., as shown in Table 1 or Table 2 below. In such a manner, the transmitted PUCCH DMRS sequence is cyclically shifted by the cyclic shift.

As an example, a cyclic shift $n_{CS}^{HARQ-ACK}$ of a PUCCH DMRS sequence is mapped to a group of HARQ-ACK codebook sizes $\{N_{HARQ-ACK}\}$ in a semi-static manner.

Table 1 shows an exemplary mapping from a HARQ-ACK codebook size to cyclic shift of the PUCCH DMRS sequence. In this example, it is assumed that the HARQ-ACK codebook size is determined based on the total number of DL (E)PDCCH assignments that should have been received by the UE. Note that the UE may be able to detect that certain DL (E)PDCCH assignments have been missed if there is a numbering field in the DL DCI. One such example is to extend the current downlink assignment index (DAI) scheme to indicate the total number of DL assignment sent by the BS. In this case, the DAI value $V_{DAI}^{DL}$ in the last DL (E)PDCCH assignment received by the UE can be used to derive the total number of DL (E)PDCCH assignments. The HARQ-ACK codebook size can be the same as the total number of DL (E)PDCCH assignments.

Based on the HARQ-ACK codebook size, the cyclic shift of the PUCCH DMRS sequence is selected according to the mapping table as exemplified in Table 1. In addition, when the DAI value $V_{DAI}^{DL}$ in the last DL (E)PDCCH assignment is used to derive the HARQ-ACK codebook size, $n_{CS}^{HARQ-ACK}$ can be selected according to the mapping between DAI value and cyclic shift as shown in Table 1. Note that $n_{CS}^{HARQ-ACK}$ can be applied together with a cell-specific cyclic shift and UE specific cyclic shift, i.e. $n_{CS}^{PUCCH} = \mod(n_{CS}^{cell} + n_{CS}^{UE} + n_{CS}^{HARQ-ACK}, N_{CS})$, or alternatively $n_{CS}^{HARQ-ACK}$ can be applied together with a cell-specific cyclic shift, i.e. $n_{CS}^{PUCCH} = \mod(n_{CS}^{cell} + n_{CS}^{HARQ-ACK}, N_{CS})$, where $N_{CS}$ is the total number of cyclic shifts within one reference symbol. It can also be extended to multiple Physical Resource Blocks (PRBs) in case multiple PRBs are used for PUCCH, i.e., $n_{CS}^{HARQ-ACK}$ is selected and mapped to DMRS on multiple PRBs.

TABLE 1

Mapping HARQ-ACK codebook size to cyclic shift of PUCCH DMRS sequence

| $V_{DAI}^{DL}$ | $\{N_{HARQ-ACK}\}$ | $n_{CS}^{HARQ-ACK}$ |
|---|---|---|
| 0 | {4, 8, . . . , 124, 128} | 0 |
| 1 | {5, 9, . . . , 125} | 3 |
| 2 | {6, 10, . . . , 125} | 6 |
| 3 | {7, 11, . . . , 127} | 9 |

As another example, when the number of PUCCH reference symbols $N_{RS}^{PUCCH}$ per slot is larger than one, the different DMRS sequences can use different cyclic shifts. Assuming that the number of reference symbols per slot is two, let $n_{CS,0}^{HARQ-ACK}$ be the cyclic shift of the first reference symbol in the slot, and let $n_{CS,1}^{HARQ-ACK}$ be the cyclic shift of the second reference symbol in the slot. Based on the HARQ-ACK codebook size the cyclic shifts are selected as in shown in Table 2.

TABLE 2

Mapping HARQ-ACK codebook size to cyclic shift of PUCCH DMRS sequence

| $V_{DAI}^{DL}$ | $\{N_{HARQ-ACK}\}$ | $n_{CS,0}^{HARQ-ACK}$ | $n_{CS,1}^{HARQ-ACK}$ |
|---|---|---|---|
| 0 | {4, 12, . . . , 116, 124} | 0 | 0 |
| 0 | {8, 16, . . . , 120, 128} | 0 | 6 |
| 1 | {5, 13, . . . , 117, 125} | 3 | 0 |
| 1 | {9, 17, . . . , 113, 121} | 3 | 6 |
| 2 | {6, 14, . . . , 118, 126} | 6 | 0 |
| 2 | {10, 18, . . . , 114, 122} | 6 | 6 |
| 3 | {7, 15, . . . , 119, 127} | 9 | 0 |
| 3 | {11, 19, . . . , 115, 123} | 9 | 6 |

Figure 6:
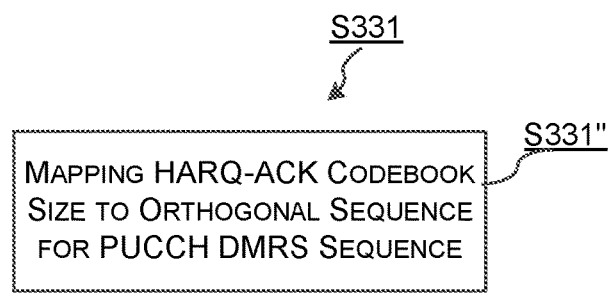

In another implementation, step S331 may be implemented by step S331″ as shown in FIG. 6. At step S331″, the UE maps the determined HARQ-ACK codebook size to an orthogonal sequence for the PUCCH DMRS sequence, e.g., as shown in Table 3 below.

As an example, when the number of PUCCH reference symbols $N_{RS}^{PUCCH}$ per slot is larger than one, an orthogonal sequence can be applied to, e.g. by being multiplied to, the DMRS sequence as follows:

$$r_{PUCCH}(m,n) = r^{\alpha}(n)w(m), m=0, \ldots, N_{RS}^{PUCCH}, n=0, \ldots, M_{SC}^{PUCCH}$$

where $r^{\alpha}(n)$ is the reference signal sequence, i.e. the DMRS sequence, $w(m)$ is the orthogonal sequence, $N_{RS}^{PUCCH}$ is the number of reference symbols and $M_{SC}^{PUCCH}$ is the length of reference signal sequence.

The orthogonal sequence $w(m)$ is mapped to one or a group of HARQ-ACK codebook sizes $\{N_{HARQ-ACK}\}$ in a semi-static manner. At the UE, the HARQ-ACK codebook size is determined based on the total number of DL (E)PDCCH assignments that should have been received by the UE. This can be done in a similar way as described previously. Based on the HARQ-ACK codebook size, $w(m)$ is selected according to the mapping table as exemplified in Table 3. The number of the reference symbols is assumed to be two here. In addition, when the DAI value $V_{DAI}^{DL}$ in the last DL (E)PDCCH assignment is used to derive the HARQ-ACK codebook size, the orthogonal sequence for the PUCCH DMRS can also be selected according to the mapping between DAI value and orthogonal sequence as shown in Table 3.

TABLE 3

Mapping HARQ-ACK codebook size to orthogonal sequence $[w(1), \ldots, w(N_{RS}^{PUCCH})]$ for PUCCH DMRS sequence

| $V_{DAI}^{DL}$ | $\{N_{HARQ-ACK}\}$ | $[w(1), \ldots, w(N_{RS}^{PUCCH})]$ |
|---|---|---|
| 0 | {4, 8, . . . , 124, 128} | [1 1] |
| 1 | {5, 9, . . . , 125} | [1 −1] |
| 2 | {6, 10, . . . , 125} | [1 j] |
| 3 | {7, 11, . . . , 127} | [1 −j] |

At step S332, the UE transmits the PUCCH DMRS sequence as the indication of the determined HARQ-ACK codebook size to the BS.

In a further implementation, the one or more PUCCH resource elements are dedicated for transmitting the indication of the determined HARQ-ACK codebook size. In other words, the HARQ-ACK codebook size is encoded and mapped to physical resources separately from the other control information (HARQ-ACK/SR/Periodic-CSI (P-CSI)) carried by PUCCH. The indication may be implicit determined by a mapping as described above or explicit in a form of the determined HARQ-ACK codebook size.

FIG. 7 illustrates an exemplary mapping for HARQ-ACK codebook size in PUCCH resource. In this example, it is assumed that the HARQ-ACK codebook size can be encoded using block coding such as Reed-Muller code or repetition coding.

As shown in FIG. 7, the HARQ-ACK codebook size may be mapped onto PUCCH resources beside, e.g. adjacent to, those for DMRS reference symbols.

In another example, the DAI value $V_{DAI}^{DL}$ in the last DL (E)PDCCH assignment may be encoded and mapped to physical resources separately from the other control information carried by PUCCH. The DAI value may then be used to derive the HARQ-ACK codebook size.

With the method 300, the UE could indicate the HARQ-ACK codebook size to the BS. Thereby, the adverse impact of the UE missing (E)PDCCH assignment can be mitigated, such that the BS could determine the HARQ-ACK codebook size before PUCCH detection.

Figure 8:
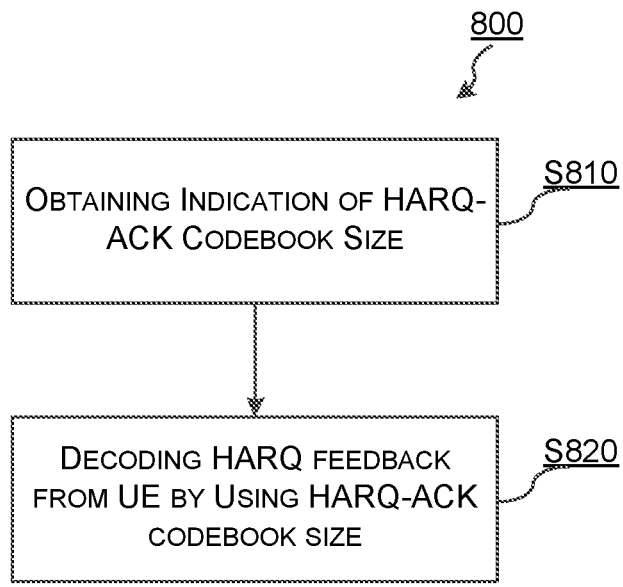
FIGS. 8-9 schematically illustrate a method 800 used in a BS according to the present disclosure.

FIG. 8 illustrates a method 800 used in a BS according to embodiments of the present disclosure. The method 800 is a BS side method corresponding to the UE side method (i.e., the method 300).

At step S810, the BS obtains an indication of a HARQ-ACK codebook size from a UE over, or on, one or more PUCCH resource elements, e.g., as shown in FIG. 7. The HARQ-ACK codebook size indicates the number of HARQ-ACK bits that the UE should encode for transmitting HARQ feedback to the BS.

At step S820, the BS decodes the HARQ feedback from the UE by using the HARQ-ACK codebook size indicated by the obtained indication.

Figure 9:
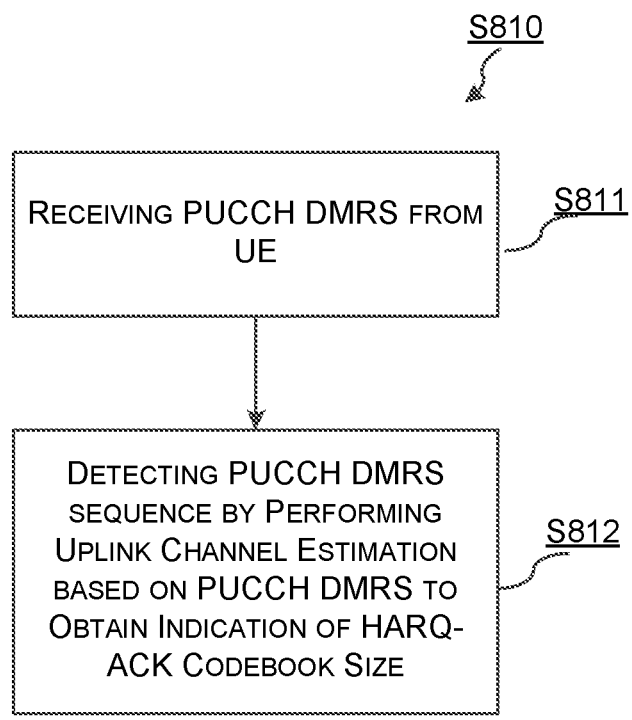

In an embodiment, step S810 may include steps S811 and S812 as shown in FIG. 9.

At step S811, the BS receives a PUCCH DMRS from the UE.

At step S812, the BS detects a PUCCH DMRS sequence by performing uplink channel estimation based on the received PUCCH DMRS, to obtain the indication of the HARQ-ACK codebook size.

In an implementation, the HARQ-ACK codebook size is mapped to a cyclic shift of PUCCH DMRS sequences, and the detected PUCCH DMRS sequence is cyclically shifted by the cyclic shift.

As an example, the BS could try to correlate the received PUCCH DMRS with PUCCH DMRS sequences, by assuming that there is no DL (E)PDCCH assignment missing. The cyclic shifts of the PUCCH DMRS sequences may be according to Table 1. If the received PUCCH DMRS is identified to be uncorrelated with one PUCCH DMRS sequence, i.e., the signal energy after de-correlation operation is lower than a predefined detection threshold, the BS may determine that at least one DL (E)PDCCH assignment is missed by the UE. The BS will then use another PUCCH DMRS sequence and repeat the above correlation operation until one correlated PUCCH DMRS sequence is found. Then, the HARQ-ACK codebook size may be determined based on Table 1 and PDCCH detection may be done accordingly by assuming this HARQ-ACK codebook size.

Alternatively, the BS may try to extract the received PUCCH DMRS in time domain based on cyclic shifts, by assuming that there is no DL (E)PDCCH assignment missing. If the extracted reference signal energy is below a predefined detection threshold, the BS determines that at least one DL (E)PDCCH assignment is missed by the UE and will then extract the received PUCCH DMRS by assuming another cyclic shift. The BS will repeat the above operation until one PUCCH DMRS sequence is found. Then, the HARQ-ACK codebook size may be determined based on Table 1 and PDCCH detection may be done accordingly by assuming this HARQ-ACK codebook size.

In another implementation, the HARQ-ACK codebook size is mapped to an orthogonal sequence for the PUCCH DMRS sequence.

For example, the BS could attempt to perform uplink channel estimation on different reference symbols based on the received PUCCH DMRS. Then, the phase difference between the two reference symbols can be determined according to Table 3, and the HARQ-ACK codebook size can be determined correspondingly. PDCCH detection may be done by assuming the obtained HARQ-ACK codebook size.

In a further implementation, the one or more PUCCH resource elements are dedicated for the indication of the HARQ-ACK codebook size.

In this implementation, the BS may attempt to decode the indication of the HARQ-ACK codebook size first to get the HARQ-ACK codebook size, and then decode the other control information HARQ-ACK/SR/P-CSI.

It is thus herein disclosed a method 300 performed by a User Equipment, UE, the method comprising:
  receiving, S310, downlink control information from a Base Station, BS;
  determining, S320, a Hybrid Automatic Repeat Request-Acknowledgement, HARQ-ACK, codebook size based on the received downlink control information, the HARQ-ACK codebook size indicating the number of HARQ-ACK bits that the UE encodes for transmitting Hybrid Automatic Repeat Request, HARQ, feedback to the BS; and
transmitting, S330, an indication of the determined HARQ-ACK codebook size to the BS on one or more Physical Uplink Control Channel, PUCCH, resource elements.

In some embodiments the transmitting, S330, the indication of the determined HARQ-ACK codebook size to the BS on one or more PUCCH resource elements comprises:
mapping, S331, the determined HARQ-ACK codebook size to a PUCCH DeModulation Reference Signal, DMRS, sequence; and
transmitting, S332, the PUCCH DMRS sequence as the indication of the determined HARQ-ACK codebook size to the BS.

In some embodiments the mapping, S331, the determined HARQ-ACK codebook size to the PUCCH DMRS sequence comprises:
Mapping, S331', the determined HARQ-ACK codebook size to a cyclic shift of one or more PUCCH DMRS sequences, such that the transmitted PUCCH DMRS sequence is cyclically shifted by the cyclic shift.

In some embodiments the mapping, S331, the determined HARQ-ACK codebook size to the PUCCH DMRS sequence comprises:
Mapping, S331", the determined HARQ-ACK codebook size to an orthogonal sequence for the PUCCH DMRS sequence.

In some embodiments the one or more PUCCH resource elements are dedicated for transmitting the indication of the determined HARQ-ACK codebook size.

Furthermore, it is herein disclosed a method, S800, performed by a Base Station, BS, the method comprising:
obtaining, S810, an indication of a Hybrid Automatic Repeat Request-Acknowledgement, HARQ-ACK, codebook size from a User Equipment, UE, on one or more Physical Uplink Control Channel, PUCCH, resource elements, the HARQ-ACK codebook size indicating the number of HARQ-ACK bits that the UE encodes for transmitting Hybrid Automatic Repeat Request, HARQ, feedback to the BS; and
decoding, S820, the HARQ feedback from the UE by using the HARQ-ACK codebook size indicated by the obtained indication.

In some embodiments the obtaining, S810, the indication of the HARQ-ACK codebook size from the UE on one or more PUCCH resource elements comprises:
receiving, S811, a PUCCH DeModulation Reference Signal, DMRS, from the UE; and
detecting, S812, a PUCCH DMRS sequence by performing uplink channel estimation based on the received PUCCH DMRS to obtain the indication of the HARQ-ACK codebook size.

In some embodiments the HARQ-ACK codebook size is mapped to a cyclic shift of one or more PUCCH DMRS sequences, and the detected PUCCH DMRS sequence is cyclically shifted by the cyclic shift.

In some embodiments the HARQ-ACK codebook size is mapped to an orthogonal sequence for the PUCCH DMRS sequence.

In some embodiments the one or more PUCCH resource elements are dedicated for the indication of the HARQ-ACK codebook size.

Figure 10:
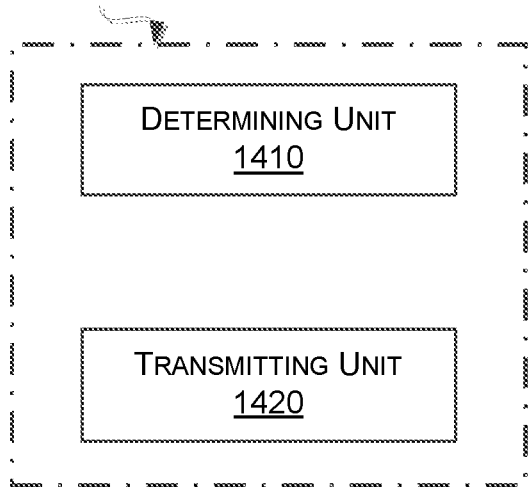
FIG. 10 is a schematic block diagram of a BS 12 according to embodiments of the present disclosure.

FIG. 10 is a block diagram depicting the BS 12 according to embodiments of the present disclosure.

As shown in FIG. 10, the BS 12 comprises a determining unit 1410 and a transmitting unit 1420.

The BS 12 and/or the determining unit 1410 may be configured to determine the HARQ-ACK codebook size for a User Equipment, UE, based on data to be transmitted in a data transmission to the UE, the HARQ-ACK codebook size indicating a number of HARQ-ACK bits for the UE 10 to encode for transmitting HARQ feedback for the data transmission to the BS 12.

The BS 12 and/or the transmitting unit 1420 may be configured to transmit the indication of the HARQ-ACK codebook size in the DAI field of the DL assignment to the UE 10. For example, the indication may be transmitted in the DAI field in the DCI message.

The BS 12 and/or the determining unit 1410 may further be configured to schedule the data transmission to the UE 10 on the set of carriers comprised in the group of carriers. The BS 12 and/or the determining unit 1410 may be configured to transmit the indication of the HARQ-ACK codebook size in the DAI field of the DL assignment to the UE by being configured to transmit, for the set of carriers, respective DCI messages. Each DCI message may comprise the DAI field and the indication of the HARQ-ACK codebook size transmitted in the DAI field of each DCI message may indicate the same first value for the set of carriers.

The first value may indicate the order by which the set of carriers comprised in the group, also denoted the first group herein, is scheduled relative to a further group of carriers comprising a further set of carriers also scheduled for the data transmission. The first value may indicate the HARQ-ACK codebook size for the first group of carriers.

The BS 12 and/or the determining unit 1410 may thus further be configured to schedule the data transmission to the UE on the further set of carriers comprised in the further group of carriers. The BS 12 and/or the transmitting unit 1420 may be configured to transmit the indication of the HARQ-ACK codebook size in the DAI field of the DL assignment to the UE by being configured to transmit, for the further set of carriers, respective DCI messages. Each DCI message may comprise the DAI field and the indication of the HARQ-ACK codebook size transmitted in the DAI field of each DCI message may indicate the same further value for the further set of carriers, which further value may be different from said first value.

The BS 12 and/or the determining unit 1410 may be configured to determine the HARQ-ACK codebook size for the UE by being configured to determine respective HARQ-ACK codebook sizes for the group, i.e. the first group, and the further group.

The HARQ-ACK bits may be ordered per group and carrier within group.

The DCI messages may comprise a bit field specifically indicating which group of carriers has been scheduled.

Figure 11:
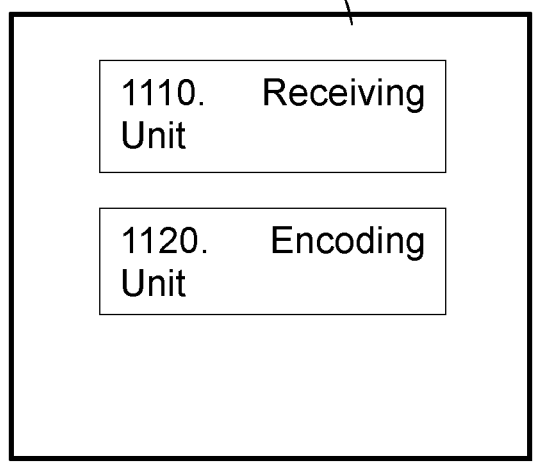
FIG. 11 is a schematic block diagram of a UE according to embodiments herein.

FIG. 11 is a block diagram depicting the UE 10 according to embodiments herein.

The UE 10 may comprise a receiving unit 1110 and the UE 10 may comprise an encoding unit 1120.

The UE 10 and/or the receiving unit 1110 is configured to receive from the BS 12, the indication of the HARQ-ACK codebook size. The HARQ-ACK codebook size indicates a number of HARQ-ACK bits for the UE 10 to encode for transmitting HARQ feedback for data received from the BS 12 in the data transmission. The indication is comprised in the DAI field of the DL assignment for the UE 10.

The UE 10 and/or the encoding unit 1120 is configured to encode the number of HARQ-ACK bits indicated by the HARQ-ACK codebook size indicated by the received indication for the HARQ feedback to the BS 12 for the data received in the data transmission from the BS 12.

The data transmission may be scheduled to the UE 10 on a set of carriers comprised in a group of carriers. The UE 10 and/or the receiving unit 1110 may then be configured to receive the indication of the HARQ-ACK codebook size comprised in the DAI field of the DL assignment for the UE by being configured to receive, for the set of carriers, respective Downlink Control Information, DCI, messages. Each DCI message may comprise the DAI field and the indication of the HARQ-ACK codebook size received in the DAI field of each DCI message may indicate the same first value for the set of carriers. There may be one DCI message per scheduled carrier.

The first value may indicate an order by which the set of carriers comprised in the group is scheduled relative to the further group of carriers comprising the further set of carriers also scheduled for the data transmission.

The data transmission to the UE 10 may further be scheduled on the further set of carriers comprised in the further group of carriers. Then, the UE 10 and/or the receiving unit 1110 may be configured to receive the indication of the HARQ-ACK codebook size comprised in the DAI field of the DL assignment for the UE by being configured to receive, for the further set of carriers, respective DCI messages. Each DCI message may comprise the DAI field and the indication of the HARQ-ACK codebook size received in the DAI field of each DCI message may indicate the same further value for the further set of carriers, which further value may be different from said first value. The values of the groups may be different for a scenario where the DAI value is used for dynamically indicating grouping of carriers to the UE 10. There may be one DCI message for each further carrier in the further set of carriers. Scheduling the data transmission may comprise scheduling time-frequency resources on the set of carriers as well as time-frequency resources on the further set of carriers.

The HARQ-ACK codebook size for the UE may be determined as respective HARQ-ACK codebook sizes for the group and the further group.

The UE 10 and/or the encoding unit 1120 may be configured to order the HARQ-ACK bits per group and carrier within group.

The DCI messages may comprise a bit field specifically indicating which group of carriers has been scheduled. The bit field may be the DAI field, which for e.g. group 0 indicates 00, group 1 indicates 01, group 2 indicates 10, group 3 indicates 11 when the bit field is 2 bits long but this could be extended to indicate further groups. In another embodiments the DAI field may indicate the order by which groups are scheduled, e.g. the DAI field may indcate for group 1 '00', group 2 '01', group 3 '10', group 4 '11', group 5 '00' when field is 2 bits long, and groups 2-5 are scheduled in sequence as they are numbered, whereas group 0 is not scheduled.

The HARQ-ACK, codebook size may based on the number of carriers comprised in each group of carriers that comprises one or more carriers upon which the data transmission is scheduled.

Figure 12:
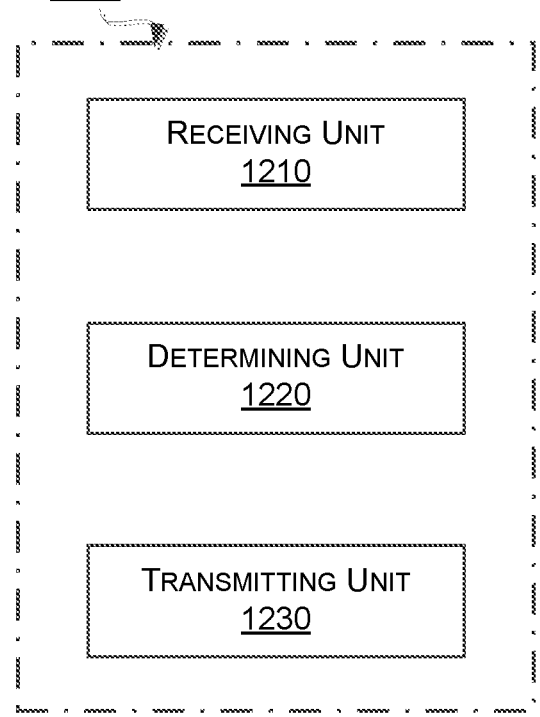
FIG. 12 is a schematic block diagram of a UE 1200 according to the present disclosure.

FIG. 12 is a schematic block diagram of a UE 1200 according to embodiments of the present disclosure. The UE 1200 is to transmit HARQ feedback to the corresponding BS, in response to data transmission from the BS.

As shown in FIG. 12. The UE 1200 comprises a receiving unit 1210, a determining unit 1220, and a transmitting unit 1230.

The receiving unit 1210 is configured to receive downlink control information from the BS.

The determining unit 1220 is configured to determine a HARQ-ACK codebook size based on the downlink control information. The HARQ-ACK codebook size indicates the number of HARQ-ACK bits that the UE should encode for transmitting HARQ feedback to the BS.

The transmitting unit 1230 is configured to transmit an indication of the determined HARQ-ACK codebook size to the BS over one or more PUCCH resource elements, e.g., as shown in FIG. 7.

In an embodiment, the transmitting unit 1230 is further configured to: map the determined HARQ-ACK codebook size to a PUCCH DMRS sequence; and transmit the PUCCH DMRS sequence as the indication of the determined HARQ-ACK codebook size to the BS.

In an implementation of this embodiment, the transmitting unit 1230 is further configured to: map the determined HARQ-ACK codebook size to a cyclic shift of PUCCH DMRS sequences, such that the transmitted PUCCH DMRS sequence is cyclically shifted by the cyclic shift, e.g., as shown in Table 1 or Table 2.

In another implementation of this embodiment, the transmitting unit 1230 is further configured to: map the determined HARQ-ACK codebook size to an orthogonal sequence for the PUCCH DMRS sequence, e.g., as shown in Table 3.

In a further implementation of this embodiment, the one or more PUCCH resource elements are dedicated for transmitting the indication of the determined HARQ-ACK codebook size, e.g., as shown in FIG. 7.

It should be noted that two or more different units in this disclosure may be logically or physically combined. For example, the receiving unit 1210 and the transmitting unit 1230 may be combined as one single unit, e.g., a transceiver in the UE.

Thus, it is herein disclosed a UE 1200, the UE comprising:
a receiving unit 1210 configured to receive downlink control information from a Base Station, BS;
a determining unit 1220 configured to determine a Hybrid Automatic Repeat Request-Acknowledgement, HARQ-ACK, codebook size based on the downlink control information, the HARQ-ACK codebook size indicating the number of HARQ-ACK bits that the UE should encode for transmitting Hybrid Automatic Repeat Request, HARQ, feedback to the BS; and
a transmitting unit 1230 configured to transmit an indication of the determined HARQ-ACK codebook size to the BS on one or more Physical Uplink Control Channel, PUCCH, resource elements.

In some embodiments the transmitting unit 1230 is further configured to:
map the determined HARQ-ACK codebook size to a PUCCH DeModulation Reference Signal, DMRS, sequence; and
transmit the PUCCH DMRS sequence as the indication of the determined HARQ-ACK codebook size to the BS.

In some embodiments the transmitting unit 1230 is further configured to:
map the determined HARQ-ACK codebook size to a cyclic shift of one or more PUCCH DMRS sequences, such that the transmitted PUCCH DMRS sequence is cyclically shifted by the cyclic shift.

In some embodiments the transmitting unit 1230 is further configured to:
map the determined HARQ-ACK codebook size to an orthogonal sequence for the PUCCH DMRS sequence.

In some embodiments the one or more PUCCH resource elements are dedicated for transmitting the indication of the determined HARQ-ACK codebook size.

Figure 13:
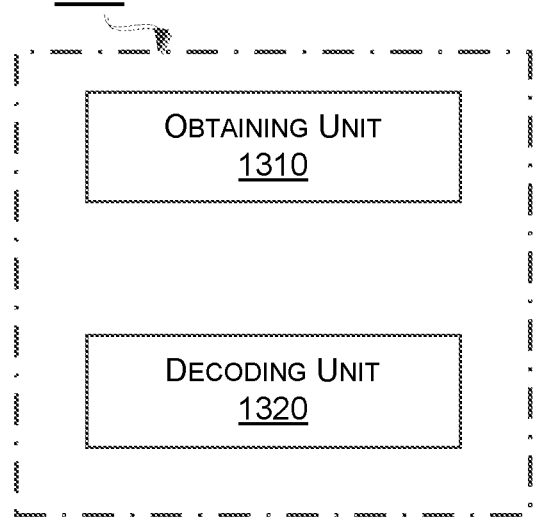
FIG. 13 is a schematic block diagram of a BS 1300 according to the present disclosure.

FIG. 13 is a schematic block diagram of a BS 1300 according to embodiments of the present disclosure.

As shown in FIG. 13, the BS 1300 comprises an obtaining unit 1310 and a decoding unit 1320.

The obtaining unit 1310 is configured to obtain an indication of a HARQ-ACK codebook size from a UE over one or more PUCCH resource elements. The HARQ-ACK codebook size indicates the number of HARQ-ACK bits that the UE should encode for transmitting HARQ feedback to the BS.

The decoding unit 1320 is configured to decode the HARQ feedback from the UE by using the HARQ-ACK codebook size indicated by the obtained indication.

In an embodiment, the obtaining unit 1310 is further configured to: receive a PUCCH DMRS from the UE; and detect a PUCCH DMRS sequence by performing uplink channel estimation based on the received PUCCH DMRS to obtain the indication of the HARQ-ACK codebook size.

In an implementation of this embodiment, the HARQ-ACK codebook size is mapped to a cyclic shift of PUCCH DMRS sequences, and the detected PUCCH DMRS sequence is cyclically shifted by the cyclic shift, e.g., as shown in Table 1 or Table 2.

In another implementation of this embodiment, the HARQ-ACK codebook size is mapped to an orthogonal sequence for the PUCCH DMRS sequence, e.g., as shown in Table 3.

In a further implementation of this embodiment, the one or more PUCCH resource elements are dedicated for the indication of the HARQ-ACK codebook size, e.g., as shown in FIG. 7.

It should be noted that two or more different units in this disclosure may be logically or physically combined. For example, the obtaining unit 1310 and the decoding unit 1320 may be combined as one single unit, e.g., a processor in the BS.

It is thus herein further disclosed a base station, BS, 1300, the BS comprising:
an obtaining unit 1310 configured to obtain an indication of a Hybrid Automatic Repeat Request-Acknowledgement, HARQ-ACK, codebook size from a User Equipment, UE, on one or more Physical Uplink Control Channel, PUCCH, resource elements, the HARQ-ACK codebook size indicating the number of HARQ-ACK bits for the UE to encode for transmitting Hybrid Automatic Repeat Request, HARQ, feedback to the BS; and
a decoding unit 1320 configured to decode the HARQ feedback from the UE by using the HARQ-ACK codebook size indicated by the obtained indication.

In some embodiments the obtaining unit 1310 is further configured to:
receive a PUCCH DeModulation Reference Signal, DMRS, from the UE; and
detect a PUCCH DMRS sequence by performing uplink channel estimation based on the received PUCCH DMRS to obtain the indication of the HARQ-ACK codebook size.

In some embodiments the HARQ-ACK codebook size is mapped to a cyclic shift of one or more PUCCH DMRS sequences, and wherein the detected PUCCH DMRS sequence is cyclically shifted by the cyclic shift.

In some embodiments the HARQ-ACK codebook size is mapped to an orthogonal sequence for the PUCCH DMRS sequence.

In some embodiments the one or more PUCCH resource elements are dedicated for the indication of the HARQ-ACK codebook size.

Figure 14:
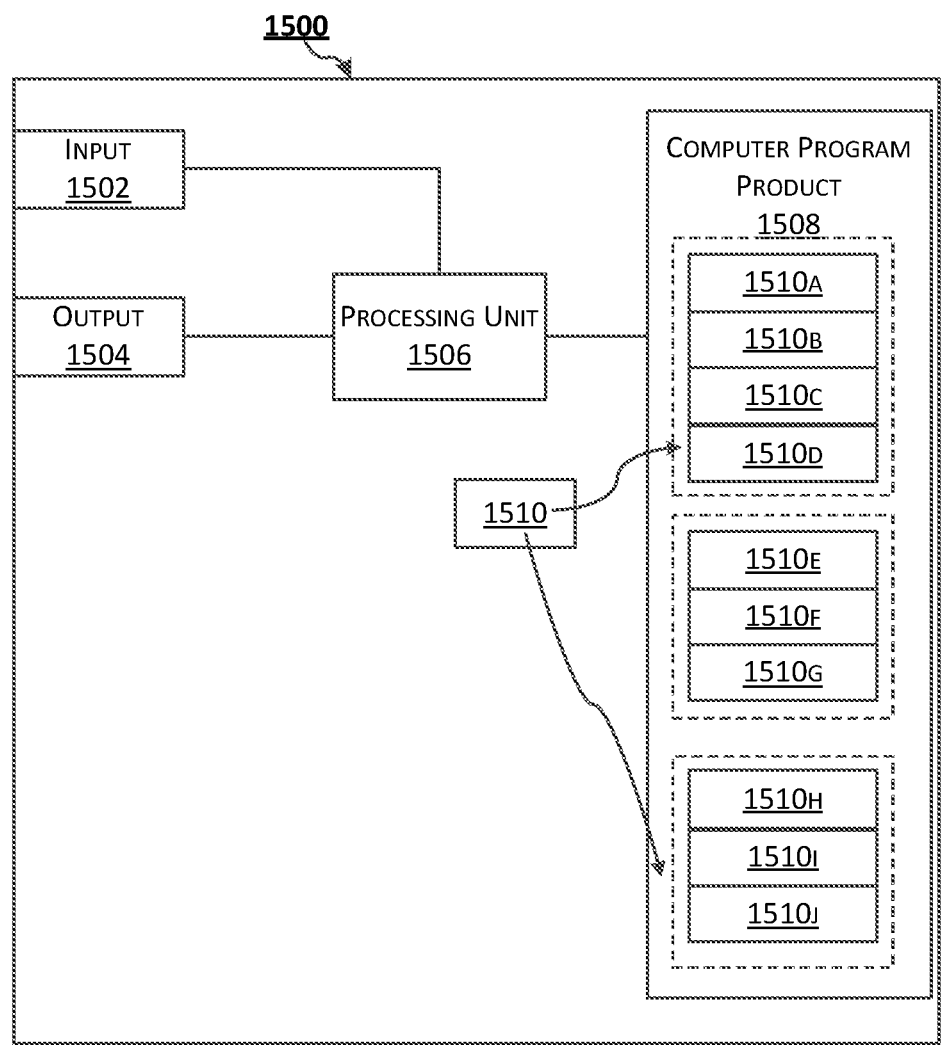
FIG. 14 schematically shows an embodiment of an arrangement 1500 comprising at least one particular computer program product 1508 according to embodiments of the present disclosure.

FIG. 14 schematically shows an embodiment of an arrangement 1500 comprising at least one particular computer program product 1508 according to embodiments of the present disclosure. The arrangement 1500 may be used in the UE 10, the UE 1200, BS 1300, or the BS 12 according to the present disclosure. Comprised in the arrangement 1500 are here a processing unit 1506, e.g., with a Digital Signal Processor (DSP). The processing unit 1506 may be a single unit or a plurality of units to perform different actions of procedures described herein. The arrangement 1500 may also comprise an input unit 1502 for receiving signals from other entities, and an output unit 1504 for providing signal(s) to other entities. The input unit and the output unit may be arranged as an integrated entity or as illustrated in the example of FIG. 10-13.

Furthermore, the at least one computer program product 1508 may be in the form of a non-volatile or volatile memory, e.g., an Electrically Erasable Programmable Read-Only Memory (EEPROM), a flash memory and a hard drive. The computer program product 1508 comprises a computer program 1510, which comprises code/computer readable instructions, which when executed by the processing unit 1506 in the arrangement 1500 causes the arrangement 1500 and/or the base station or the UE in which it is comprised to perform the actions, e.g., of the procedure described earlier in conjunction with either of FIGS. 2b, 2d, 3 and 8.

The computer program 1510 may be configured as a computer program code structured in computer program modules 1510A-1510D, 1510E-1510G, or 1510H-1510J.

In one embodiment when the arrangement 1500 is used in the BS 12, the code in the computer program of the arrangement 1500 includes a determining module 1510H, for determining a HARQ-ACK codebook size for the UE, based on data to be transmitted in the data transmission to the UE. The HARQ-ACK codebook size indicates the number of HARQ-ACK bits for the UE to encode or that the UE should encode for transmitting HARQ feedback for the data transmission to the BS. The code in the computer program 1510 further includes a transmitting module 1510I, for transmitting the indication of the HARQ-ACK codebook size in the DAI field of the DL assignment to the UE. The code in the computer program 1510 may comprise further modules, illustrated as module 1510J, e.g. for controlling and performing other related procedures associated with the BS's operations.

Hence, in an exemplifying embodiment when the arrangement 1500 is used in the UE 10, the code in the computer program of the arrangement 1500 includes a receiving module 1510A configured to receive from the BS 12, the indication of the HARQ-ACK codebook size, the HARQ-ACK codebook size indicating the number of HARQ-ACK bits for the UE to encode for transmitting HARQ feedback for the data received from the BS in the data transmission. The indication is comprised in the DAI field of the DL assignment for the UE. The code in the computer program 1510 may further include an encoding module 1510D configured to encode the number of HARQ-ACK bits indicated by the HARQ-ACK codebook size indicated by the received indication for the HARQ feedback to the BS for the data received in the data transmission from the BS.

It is further disclosed when the arrangement 1500 is used in the UE 1200, that the code in the computer program of the arrangement 1500 includes a receiving module 1510A, for receiving downlink control information from the BS. The code in the computer program 1510 further includes a determining module 1510B, for determining a HARQ-ACK codebook size based on the downlink control information. The HARQ-ACK codebook size indicates the number of HARQ-ACK bits that the UE should encode for transmitting HARQ feedback to the BS. The code in the computer program 1510 may further include a transmitting module 1510C, for transmitting an indication of the determined HARQ-ACK codebook size to the BS over one or more PUCCH resource elements. The code in the computer program 1510 may comprise further modules, e.g. for controlling and performing other related procedures associated with the UE's operations.

In yet another exemplifying embodiment when the arrangement 1500 is used in the BS 1300, the code in the computer program of the arrangement 1500 includes an obtaining module 1510E, for obtaining an indication of a HARQ-ACK codebook size from a UE over one or more PUCCH resource elements. The HARQ-ACK codebook size indicates the number of HARQ-ACK bits that the UE should encode for transmitting HARQ feedback to the BS. The code in the computer program 1510 further includes a decoding module 1510F, for decoding the HARQ feedback from the UE by using the HARQ-ACK codebook size indicated by the obtained indication. The code in the computer program 1510 may comprise further modules, illustrated as module 1510G, e.g. for controlling and performing other related procedures associated with the BS's operations.

Figure 2D:
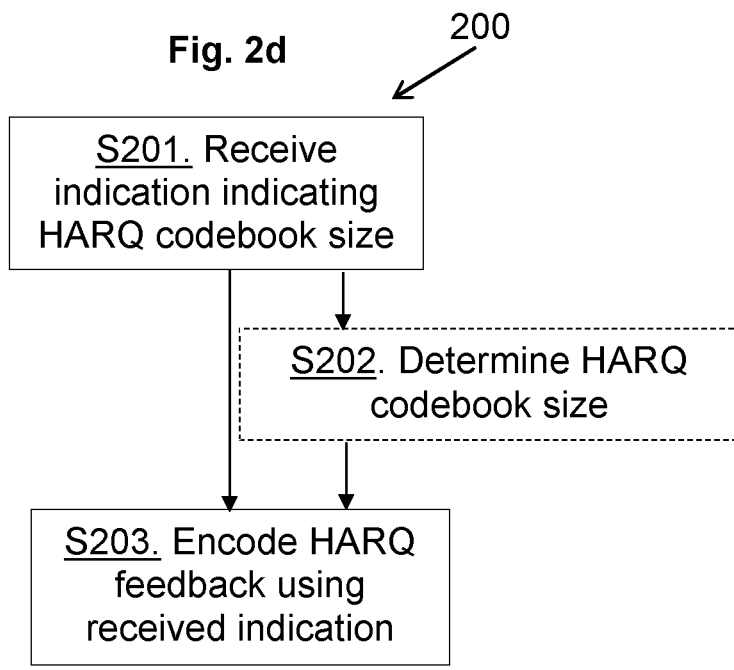
FIG. 2d schematically illustrates a method used in a UE according to embodiments herein FIGS. 3-6 schematically illustrates a method 300 used in a UE according to the present disclosure.

The computer program modules could essentially perform the actions of the flow illustrated in FIG. 2b to emulate the BS 12, or the actions of the flow illustrated in FIG. 2d to emulate the UE 10, or the actions of the flow illustrated in FIG. 3, to emulate the UE 1200, or the actions of the flow illustrated in FIG. 8, to emulate the BS 1300. In other words, when the different computer program modules are executed in the processing unit 1506, they may correspond, e.g., to the units 1410-1420 of FIG. 2b, to the units 1110-1120 of FIG. 2d, to the units 1210-1230 of FIG. 12, or to the units 1310-1320 of FIG. 13.

Although the code means in the embodiments disclosed above in conjunction with FIG. 14 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a Base Station, BS, the method comprising:
   determining a Hybrid Automatic Repeat Request-Acknowledgement, HARQ-ACK, codebook size for a User Equipment, UE, based on data to be transmitted in a data transmission to the UE, the HARQ-ACK codebook size indicating a number of HARQ-ACK bits for the UE to encode for transmitting Hybrid Automatic Repeat Request, HARQ, feedback for the data transmission to the BS; wherein the data transmission to the UE is scheduled on a set of carriers comprised in a group of carriers;
   transmitting an indication of the HARQ-ACK codebook size in a Downlink Assignment Index, DAI, field of a Downlink, DL, assignment to the UE comprises, transmitting, for the set of carriers, respective Downlink Control Information, DCI, messages, wherein each DCI message comprises the DAI field, wherein the indication of the HARQ-ACK codebook size transmitted in the DAI field of each DCI message indicates the same first value for the set of carriers; and
   wherein the first value indicates an order by which the set of carriers comprised in the group is scheduled relative to a further group of carriers comprising a further set of carriers also scheduled for the data transmission.

2. A method performed by a user equipment, UE, the method comprising:
   receiving, from a base station, BS, an indication of a Hybrid Automatic Repeat Request-Acknowledgement, HARQ-ACK, codebook size, the HARQ-ACK codebook size indicating a number of HARQ-ACK bits for the UE to encode for transmitting Hybrid Automatic Repeat Request, HARQ, feedback for data received from the BS in a data transmission, which indication is comprised in a Downlink Assignment Index, DAI, field of a Downlink, DL, assignment for the UE;
   encoding the number of HARQ-ACK bits indicated by the HARQ-ACK codebook size indicated by the received indication for the HARQ feedback to the BS for the data received in the data transmission from the BS;
      wherein the data transmission to the UE is scheduled on a set of carriers comprised in a group of carriers;
      wherein the receiving the indication of the HARQ-ACK codebook size comprised in the DAI field of the DL assignment for the UE comprises, receiving, for the set of carriers, respective Downlink Control Information, DCI, messages, wherein each DCI message comprises the DAI field, wherein the indication of the HARQ-ACK codebook size received in the DAI field of each DCI message indicates the same first value for the set of carriers; and
      wherein the first value indicates an order by which the set of carriers comprised in the group is scheduled relative to a further group of carriers comprising a further set of carriers also scheduled for the data transmission.

3. A Base Station, BS, comprising a processing unit and a memory, said memory containing instructions executable by said processing unit, wherein the BS being configured to:
   determine a Hybrid Automatic Repeat Request-Acknowledgement, HARQ-ACK, codebook size for a User Equipment, UE, based on data to be transmitted in a data transmission to the UE, the HARQ-ACK codebook size indicating a number of HARQ-ACK bits for the UE to encode for transmitting Hybrid Automatic Repeat Request, HARQ, feedback for the data transmission to the BS; wherein the BS is further configured to schedule the data transmission to the UE on a set of carriers comprised in a group of carriers;
   transmit an indication of the HARQ-ACK codebook size in a Downlink Assignment Index, DAI, field of a Downlink, DL, assignment to the UE comprises the BS being configured to transmit, for the set of carriers, respective Downlink Control Information, DCI, messages; wherein each DCI message comprises the DAI field; wherein the indication of the HARQ-ACK codebook size transmitted in the DAI field of each DCI message indicates the same first value for the set of carriers; and
      wherein the first value indicates an order by which the set of carriers comprised in the group is scheduled relative to a further group of carriers comprising a further set of carriers also scheduled for the data transmission.

4. The BS according to claim 3, wherein the BS is further configured to schedule the data transmission to the UE on a further set of carriers comprised in a further group of carriers, and wherein the BS being configured to transmit the indication of the HARQ-ACK codebook size in the DAI field of the DL assignment to the UE comprises the BS being configured to transmit, for the further set of carriers, respective DCI messages, wherein each DCI message comprises the DAI field and wherein the indication of the HARQ-ACK codebook size transmitted in the DAI field of each DCI message indicates the same further value for the further set of carriers, which further value is different from said first value.

5. The BS according to claim 3, wherein the BS is configured to determine the HARQ-ACK codebook size for the UE by being configured to determine respective HARQ-ACK codebook sizes for the group and the further group.

6. The BS according to claim 3, wherein the HARQ-ACK bits are ordered per group and carrier within group.

7. The BS according to claim 3, wherein the DCI messages comprise a bit field specifically indicating which group of carriers has been scheduled.

8. A user equipment, UE, comprising a processing unit and a memory, said memory containing instructions executable by said processing unit, wherein the UE being configured to:
   receive, from a base station, BS, an indication of a Hybrid Automatic Repeat Request-Acknowledgement, HARQ-ACK, codebook size, the HARQ-ACK codebook size indicating a number of HARQ-ACK bits for the UE to encode for transmitting Hybrid Automatic Repeat Request, HARQ, feedback for data received from the BS in a data transmission, which indication is comprised in a Downlink Assignment Index, DAI, field of a Downlink, DL, assignment for the UE;
   encode the number of HARQ-ACK bits indicated by the HARQ-ACK codebook size indicated by the received indication for the HARQ feedback to the BS for the data received in the data transmission from the BS;

wherein the data transmission is scheduled to the UE on a set of carriers comprised in a group of carriers;

wherein the UE being configured to receive the indication of the HARQ-ACK codebook size comprised in the DAI field of the DL assignment for the UE comprises the UE being configured to receive, for the set of carriers, respective Downlink Control Information, DCI, messages, wherein each DCI message comprises the DAI field and wherein the indication of the HARQ-ACK codebook size received in the DAI field of each DCI message indicates the same first value for the set of carriers; and wherein the first value indicates an order by which the set of carriers comprised in the group is scheduled relative to a further group of carriers comprising a further set of carriers also scheduled for the data transmission.

9. The UE according to claim 8, wherein the data transmission to the UE is further scheduled on a further set of carriers comprised in a further group of carriers, and wherein the UE being configured to receive the indication of the HARQ-ACK codebook size comprised in the DAI field of the DL assignment for the UE comprises the UE being configured to receive, for the further set of carriers, respective DCI messages, wherein each DCI message comprises the DAI field and wherein the indication of the HARQ-ACK codebook size received in the DAI field of each DCI message indicates the same further value for the further set of carriers, which further value is different from said first value.

10. The UE according to claim 8, wherein HARQ-ACK codebook size for the UE is determined as respective HARQ-ACK codebook sizes for the group and the further group.

11. The UE according to claim 8, wherein the UE is configured to order the HARQ-ACK bits per group and carrier within group.

12. The UE according to claim 8, wherein the DCI messages comprise a bit field specifically indicating which group of carriers has been scheduled.

* * * * *